(12) United States Patent
Park et al.

(10) Patent No.: US 8,631,455 B2
(45) Date of Patent: Jan. 14, 2014

(54) ADAPTIVE STREAMING FOR DIGITAL CONTENT DISTRIBUTION

(75) Inventors: Anthony Neal Park, San Jose, CA (US); Wei Wei, Fremont, CA (US)

(73) Assignee: Netflix, Inc., Los Gatos, CA (US)

( * ) Notice: Subject to any disclaimer, the term of this patent is extended or adjusted under 35 U.S.C. 154(b) by 1173 days.

(21) Appl. No.: 12/509,365

(22) Filed: Jul. 24, 2009

(65) Prior Publication Data

US 2011/0023076 A1    Jan. 27, 2011

(51) Int. Cl.
*H04N 7/173* (2011.01)

(52) U.S. Cl.
USPC ............................................. 725/116

(58) Field of Classification Search
None
See application file for complete search history.

(56) References Cited

U.S. PATENT DOCUMENTS

| | | | |
|---|---|---|---|
| 5,608,732 A * | 3/1997 | Bestler et al. ................ | 370/474 |
| 6,438,630 B1 * | 8/2002 | DeMoney ...................... | 710/56 |
| 6,453,114 B2 * | 9/2002 | Schultz et al. ................ | 386/351 |
| 6,967,910 B2 * | 11/2005 | Yamamoto .................... | 369/47.11 |
| 7,234,007 B2 * | 6/2007 | Castellano et al. ............ | 710/29 |
| 7,263,129 B2 * | 8/2007 | Kawa et al. ............... | 375/240.25 |
| 7,818,444 B2 * | 10/2010 | Brueck et al. ................ | 709/231 |
| 2003/0067872 A1 * | 4/2003 | Harrell et al. ................ | 370/229 |
| 2005/0123274 A1 * | 6/2005 | Crinon et al. .................. | 386/69 |
| 2008/0148324 A1 * | 6/2008 | Joyce et al. .................... | 725/94 |
| 2008/0259799 A1 * | 10/2008 | van Beek ...................... | 370/235 |
| 2009/0083279 A1 * | 3/2009 | Hasek ............................ | 707/10 |

FOREIGN PATENT DOCUMENTS

| | | |
|---|---|---|
| JP | 2004-172830 A2 | 6/2004 |
| JP | 2006-174419 A2 | 6/2006 |
| JP | 2008-537393 A | 9/2008 |

OTHER PUBLICATIONS

PCT Search Report, PCT Appl. No. PCT/US2010/045805, mailed Oct. 6, 2010.

* cited by examiner

*Primary Examiner* — Brian Pendleton
*Assistant Examiner* — Ryan Stronczer
(74) *Attorney, Agent, or Firm* — Patterson & Sheridan, L.L.P.

(57) ABSTRACT

One embodiment of the present invention sets forth a technique for adapting playback bit rate to available delivery bandwidth in a content delivery system comprising a content server and a content player. A content player periodically estimates whether a given playback bit rate can feasibly provide complete playback for a given title assuming currently available bandwidth. If playback becomes unfeasible at a current bit rate assuming currently available bandwidth, then the content player adapts the bit rate downward until a feasible bit rate is achieved. If playback is feasible using a higher bit rate, then the content player may adapt the bit rate upward.

22 Claims, 12 Drawing Sheets

ADAPTIVE STREAMING FOR DIGITAL CONTENT DISTRIBUTION

BACKGROUND OF THE INVENTION

1. Field of the Invention

Embodiments of the present invention relate generally to digital media and, more specifically, to adaptive streaming for digital content distribution.

2. Description of the Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology, and may comprise audio data, video data, or a combination thereof.

The content player is configured to download and play a digital content file, in response to a user request selecting the title for playback. The process of playing the digital content file includes decoding and rendering audio and video data into an audio signal and a video signal, which may drive a display system having a speaker subsystem and a video subsystem. Playback typically involves a technique known in the art as "streaming," whereby the content server sequentially transmits the digital content file to the content player, and the content player plays the digital content file while content data is received that comprises the digital content file. To account for variable latency and bandwidth within the communications network, a content buffer queues the incoming content data ahead of the content data actually being played. During moments of network congestion, which leads to lower available bandwidth, less content data is added to the content buffer, which may drain down as content data is being de-queued to support playback at a certain playback bit rate. However, during moments of high network bandwidth, the content buffer is replenished and additional buffer time is added until the content buffer is generally full again. In practical systems, the content buffer may queue content data corresponding to a time span ranging from seconds to more than a minute.

Each digital content file stored on the content server is typically encoded for a specific playback bit rate. Prior to initiating playback, the content player may measure available bandwidth from the content server and select a digital content file having an bit rate that can be supported by the measured available bandwidth. To maximize playback quality, a digital content file with the highest bit rate not exceeding the measured bandwidth is conventionally selected. To the extent the communications network can provide adequate bandwidth to download the selected digital content file while satisfying bit rate requirements, playback proceeds satisfactorily. In practice, however, available bandwidth in the communications network is constantly changing as different devices connected to the communications network perform independent tasks. If available bandwidth in the communications network drops below a level required to satisfy a playback bit rate requirement for a sufficiently long period of time, then the content buffer may drain completely, resulting in a condition known in the art as a buffer under-run. If a buffer under-run occurs, playback may become highly unreliable or halt altogether, severely diminishing overall playback quality. Because traffic over a conventional communications network tends to be unpredictable, congestion and diminished bandwidth is a common occurrence that negatively impacts conventional streaming playback systems.

One technique for reducing the likelihood of a buffer under-run in a streaming playback system is to select a conservatively low bit rate for playback. However, in doing so, the user ends up with a lower quality playback experience, even though a higher quality experience may have been possible. Another technique for reducing the likelihood of a buffer under-run is to pre-buffer a relatively large portion of the overall digital content file prior to beginning playback. However, this technique necessarily requires the user to wait a relatively long time before playback can begin, and therefore diminishes the overall playback experience.

As the foregoing illustrates, what is needed in the art is an approach for downloading digital content files to a content player that provides a higher quality playback experience than prior art approaches.

SUMMARY OF THE INVENTION

One embodiment of the present invention sets forth a method for adaptively downloading a file of digital content from a content server to a content player. The method includes the steps of downloading at least one unit of digital content from a first encoded sequence included within the file to a content buffer within the content player, where the file includes a plurality of encoded sequences, each encoded sequence corresponds to a different bit rate at which digital content stored in the content buffer can be accessed for playback, and the first encoded sequence corresponds to a lowest bit rate at which the digital content stored in the content buffer can be accessed for playback, determining that one or more units of digital content in the file of digital content still have to be downloaded and buffered for playback, determining a next encoded sequence included in the plurality of encoded sequences from which to download a next unit of digital content, and downloading the next unit of digital content from the next encoded sequence to the content buffer for playback.

One advantage of the disclosed method is that potential buffer under-runs based on playback bit rates and available download bandwidth are tracked and units of digital content are downloaded at the highest image quality possible while avoiding a buffer under-run condition.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
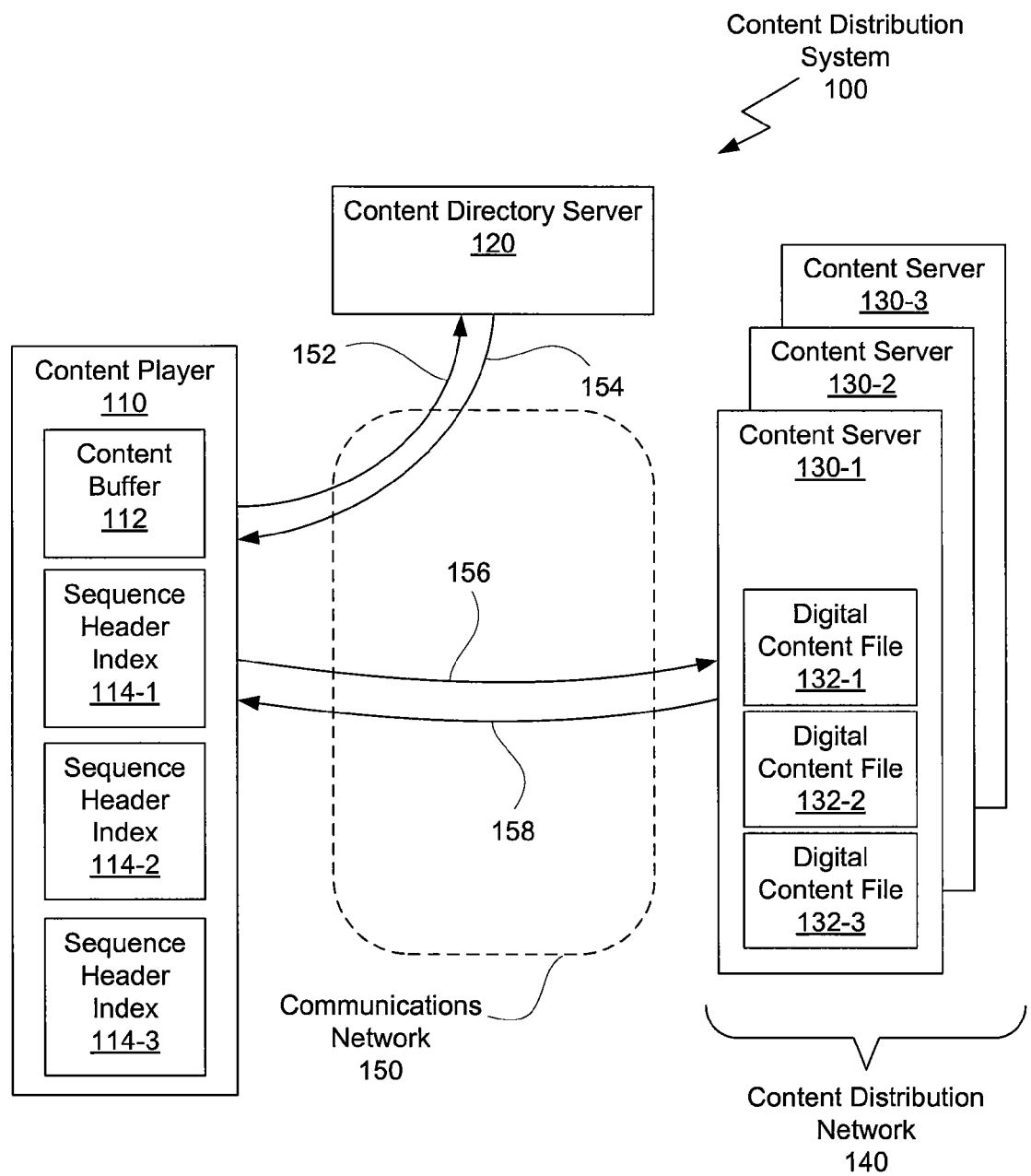
FIG. 1 illustrates a content distribution system configured to implement one or more aspects of the present invention.

FIG. 1 illustrates a content distribution system 100 configured to implement one or more aspects of the present invention. As shown, the content distribution system 100 includes, without limitation, a content player 110, one or more content servers 130, and a communications network 150. The content distribution system 100 may also include a content directory server 120. In one embodiment, the one or more content servers 130 comprise a content distribution network (CDN) 140.

The communications network 150 includes a plurality of network communications systems, such as routers and switches, configured to facilitate data communication between the content player 110 and the one or more content servers 130. Persons skilled in the art will recognize that many technically feasible techniques exist for building the communications network 150, including technologies practiced in deploying the well-known internet communications network.

The content directory server 120 comprises a computer system configured to receive a title lookup request 152 and generate file location data 154. The title lookup request 152 includes, without limitation, a name of a movie or song requested by a user. The content directory server 120 queries a database (not shown) that maps a video stream of a given title encoded at a particular playback bit rate to a digital content file 132, residing within an associated content server 130. The file location data 154 includes, without limitation, a reference to a content server 130 that is configured to provide the digital content file 132 to the content player 110.

The content server 130 is a computer system configured to serve download requests for digital content files 132 from the content player 110. The digital content files may reside on a mass storage system accessible to the computer system. The mass storage system may include, without limitation, direct attached storage, network attached file storage, or network attached block-level storage. The digital content files 132 may be formatted and stored on the mass storage system using any technically feasible technique. A data transfer protocol, such as the well-known hyper-text transfer protocol (HTTP), may be used to download digital content files 132 from the content server 130 to the content player 110.

Each title (a movie, song, or other form of digital media) is associated with one or more digital content files 132. Each digital content file 132 comprises, without limitation, a sequence header index 114, audio data and an encoded sequence. An encoded sequence comprises a complete version of the video data corresponding title encoded to a particular playback bit rate. For example, a given title may be associated with digital content file 132-1, digital content file 132-2 and digital content file 132-3. Digital content file 132-1 may comprise sequence header index 114-1 and an encoded sequence encoded to an average playback bit rate of approximately 250 kilobits per second (Kbps). Digital content file 132-2 may comprise sequence header index 114-2 and an encoded sequence encoded to an average playback bit rate of approximately 1000 Kbps. Similarly, digital content file 132-3 may comprise sequence header index 114-3 and an encoded sequence encoded to an average playback bit rate of approximately 1500 Kbps. The 1500 Kbps encoded sequence enables higher quality playback and is therefore more desirable for playback versus the 250 Kbps encoded sequence.

An encoded sequence within a digital content file 132 is organized as units of video data representing a fixed span of playback time. Overall playback time is organized into sequential time slots, each corresponding to one fixed span of playback time. For a given time slot, one unit of video data is represented within the digital content file 132 for the playback bit rate associated with the digital content file 132. Because variable bit rate encoding may be used, each unit of video data may be variable in size, despite a direct correspondence to the fixed span of playback time. For the above example, each time slot within the digital content file 132-1 comprising an encoded sequence encoded to a playback bit rate of 1500 Kbps would include a unit of video data encoded at 1500 Kbps. In one embodiment, units of audio data are encoded at a fixed bit rate for each time slot and stored in the digital content file 132.

The units of video data and units of audio data are configured to provide time-synchronized playback, beginning at the start of each time slot. To avoid starving either audio playback or video playback, units of audio data and units of video data are downloaded in a generally alternating pattern to assure that the audio buffer 244 and video buffer 246 store comparable durations of playback time each.

Persons skilled in the art will readily recognize that each encoded sequence, as defined above, comprises a digital content "stream." Furthermore, the process of downloading a particular encoded sequence from the content server 130 to the content player 110 comprises "streaming" the digital content to the content player 110 for playback at a particular playback bit rate.

The content player 110 may comprise a computer system, a set top box, a mobile device such as a mobile phone, or any other technically feasible computing platform that has network connectivity and is coupled to or includes a display device and speaker device for presenting video frames, and generating acoustic output, respectively. As described in greater detail below, the content player 110 is configured to download a unit of video data for a selected bit rate, and adapt the selected bit rate for subsequently downloaded units of video data based on prevailing bandwidth conditions within the communications network 150.

As available bandwidth within the communications network 150 becomes limited, the content player may select a lower bit rate encoding for units of video data that have not yet been downloaded corresponding to subsequent time slots. As available bandwidth increases, a higher bit rate encoding may be selected.

Although, in the above description, the content distribution system 100 is shown with one content player 110 and one CDN 140, persons skilled in the art will recognize that the architecture of FIG. 1 contemplates only an exemplary embodiment of the invention. Other embodiments, may include any number of content players 110 and/or CDNs 140. Thus, FIG. 1 is in no way intended to limit the scope of the present invention in any way.

Figure 2:
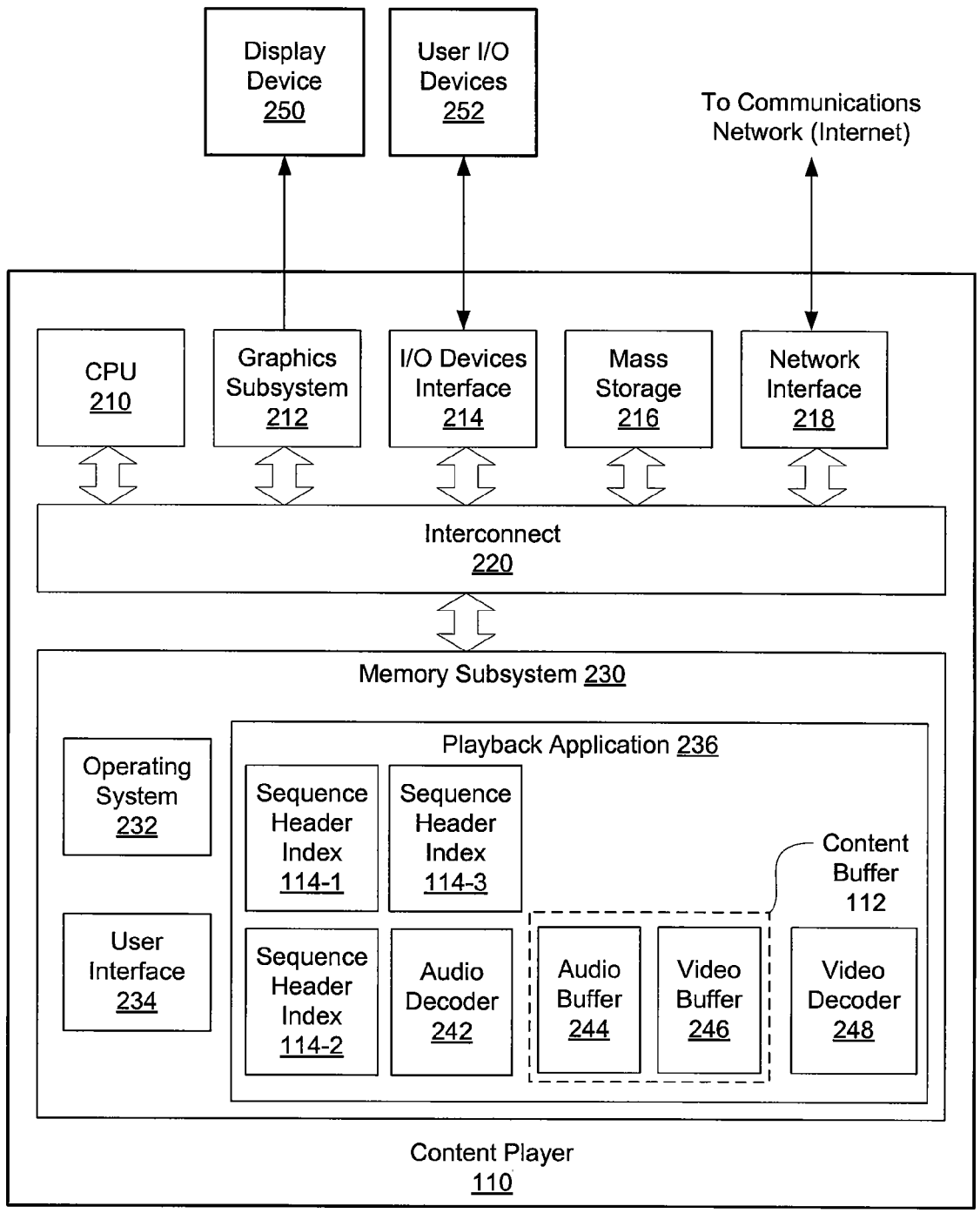
FIG. 2 is a more detailed view of the content player of FIG. 1, according to one embodiment of the invention.

FIG. 2 is a more detailed view of the content player 110 of FIG. 1, according to one embodiment of the invention. As shown, the content player 110 includes, without limitation, a central processing unit (CPU) 210, a graphics subsystem 212, an input/output (I/O) device interface 214, a network interface 218, an interconnect 220, and a memory subsystem 230. The content player 110 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 220 is configured to facilitate transmission of data, such as programming instructions and application data, between the CPU 210, graphics subsystem 212, I/O devices interface 214, mass storage 216, network interface 218, and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 220. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 150. In one embodiment, the network interface 218 is configured to communicate using the well-known Ethernet standard. The network interface 218 is coupled to the CPU 210 via the interconnect 220.

The memory subsystem 230 includes programming instructions and data that comprise an operating system 232, user interface 234, and playback application 236. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234 provides a specific structure, such as a window and object metaphor, for user interaction with content player 110. Persons skilled in the art will recognize the various operating systems and user interfaces that are well-known in the art and suitable for incorporation into the content player 110.

The playback application 236 is configured to retrieve a digital content file 132 from a content server 130 via the network interface 218 and play the digital content file 132 through the graphics subsystem 212. The graphics subsystem 212 is configured to transmit a rendered video signal to the display device 250. In normal operation, the playback application 236 receives a request from a user to play a specific title. The playback application 236 then locates the digital content files 132 associated with the requested title, where each digital content file 132 associated with the requested title includes an encoded sequence encoded to a different playback bit rate. In one embodiment, the playback application 236 locates the digital content files 132 by posting title lookup request 152 to the content directory server 120. The content directory server 120 replies to the title lookup request 152 with file location data 154 for each digital content file 132 associated with the requested title. Each file location data 154 includes a reference to the associated content server 130, in which the requested digital content file 132 resides. The title lookup request 152 may include the name of the requested title, or other identifying information with respect to the title. After the playback application 236 has located the digital content files 132 associated with the requested title, the playback application 236 downloads sequence header indices 114 associated with each digital content file 132 associated with the requested title from the content server 130. A sequence header index 114 associated with digital content file 132, described in greater detail in FIG. 4A, includes information related to the encoded sequence included in the digital content file 132.

In one embodiment, the playback application 236 begins downloading the digital content file 132 associated with the requested title comprising the encoded sequence encoded to the lowest playback bit rate to minimize startup time for playback. For the purposes of discussion only, the digital content file 132-1 is associated with the requested title and comprises the encoded sequence encoded to the lowest playback bit rate. The requested digital content file 132-1 is downloaded into the content buffer 112, configured to server as a first-in, first-out queue. In one embodiment, each unit of downloaded data comprises a unit of video data or a unit of audio data. As units of video data associated with the requested digital content file 132-1 are downloaded to the content player 110, the units of video data are pushed into the content buffer 112. Similarly, as units of audio data associated with the requested digital content file 132-1 are downloaded to the content player 110, the units of audio data are pushed into the content buffer 112. In one embodiment the units of video data are stored in video buffer 246 within the content buffer 112, and units of audio data are stored in audio buffer 224, also within the content buffer 112.

A video decoder 248 reads units of video data from the video buffer 246, and renders the units of video data into a sequence of video frames corresponding in duration to the fixed span of playback time. Reading a unit of video data from the video buffer 246 effectively de-queues the unit of video data from the video buffer 246 (and from the content buffer 112). The sequence of video frames is processed by graphics subsystem 212 and transmitted to the display device 250.

An audio decoder 242 reads units of audio data from the audio buffer 244, and renders the units of audio data into a sequence of audio samples, generally synchronized in time with the sequence of video frames. In one embodiment, the sequence of audio samples is transmitted to the I/O device interface 214, which converts the sequence of audio samples into the electrical audio signal. The electrical audio signal is transmitted to the speaker within the user I/O devices 252, which, in response, generates an acoustic output.

When playback is initiated, the playback application 236 requests units of video data encoded to the lowest available bit rate, thereby minimizing start time perceived by a user. However, as bandwidth conditions within the communications network 150 allow, the playback application 236 may request units of video data encoded to higher bit rates, thereby improving playback quality over time, without introducing a startup delay commensurate with the highest level of playback quality ultimately achieved by the playback application 236. If bandwidth conditions within the communications network 150 deteriorate during playback, then the playback application 236 may request subsequent units of video data encoded to a lower bit rate. In one embodiment, the playback application 236 determines which encoded bit rate should be used for each sequential download of a unit of video data based on a bandwidth estimate calculated over one or more recently downloaded units of video data.

Figure 3:
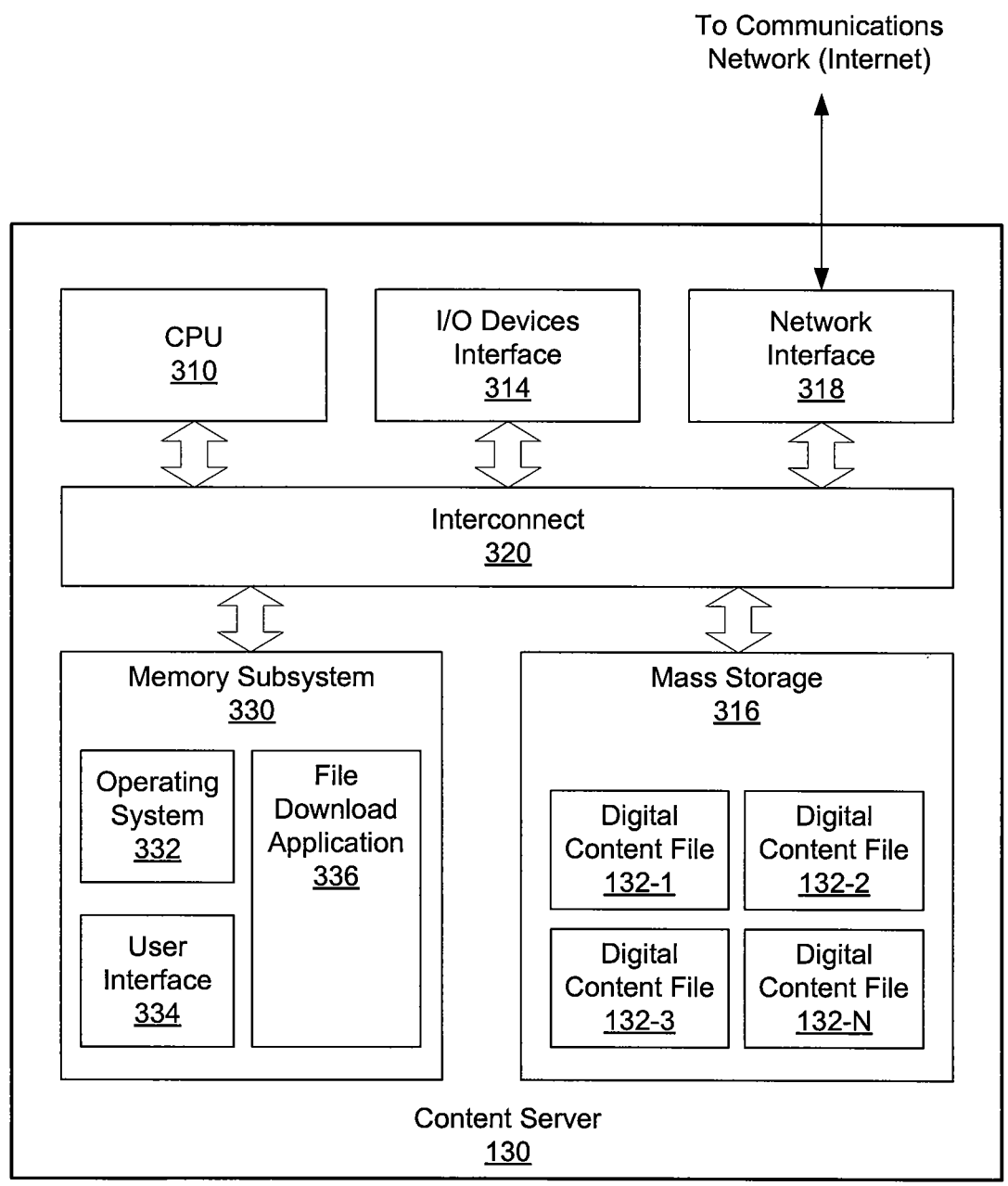
FIG. 3 is a more detailed view of the content server of FIG. 1, according to one embodiment of the invention.

FIG. 3 is a more detailed view of the content server 130 of FIG. 1, according to one embodiment of the invention. The content server 130 includes, without limitation, a central processing unit (CPU) 310, a network interface 318, an interconnect 320, a memory subsystem 330, and a mass storage unit 316. The content server 130 may also include an I/O devices interface 314.

The CPU 310 is configured to retrieve and execute programming instructions stored in the memory subsystem 330. Similarly, the CPU 310 is configured to store and retrieve application data residing in the memory subsystem 330. The interconnect 320 is configured to facilitate transmission of data, such as programming instructions and application data, between the CPU 310, I/O devices interface 314, mass storage unit 316, network interface 318, and memory subsystem 330.

The mass storage unit 316 stores digital content files 132-1 through 132-N. The digital content files 132 may be stored using any technically feasible file system on any technically feasible media. For example the mass storage unit 316 may comprise a redundant array of independent disks (RAID) system incorporating a conventional file system.

The memory subsystem 330 includes programming instructions and data that comprise an operating system 332, a user interface 334, and a file download application 336. The operating system 332 performs system management functions such as managing hardware devices including the network interface 318, mass storage unit 316, and I/O devices interface 314. The operating system 332 also provides process and memory management models for the user interface 334 and the file download application 336. The user interface 334 provides a specific structure, such as a window and an object metaphor or a command line interface, for user interaction with content server 130. A user may employ the user interface 334 to manage functions of the content server. In one embodiment, the user interface 334 presents a management web page for managing operation of the content server 130. Persons skilled in the art will recognize the various operating systems and user interfaces that are well-known in the art and suitable for incorporation into the content player 130.

The file download application 336 is configured to facilitate transfer of digital content files 132-1 to 132-N, to the content player 110, via a file download operation or set of operations. The downloaded digital content file 132 is transmitted through network interface 318 to the content player 110 via the communications network 150. In one embodiment, file contents of each digital content file 132 may be accessed in an arbitrary sequence (known in the art as "random access"). As previously described herein, each digital content file 132 includes a sequence header index 114 and an encoded sequence. An encoded sequence comprises a full version of a given movie or song encoded to a particular bit rate, and video data associated with the encoded sequence is divided into units of video data. Each unit of video data corresponds to a specific span of playback time and begins with a frame including a sequence header specifying the size and the resolution of the video data stored in the unit of video data.

Figure 4A:
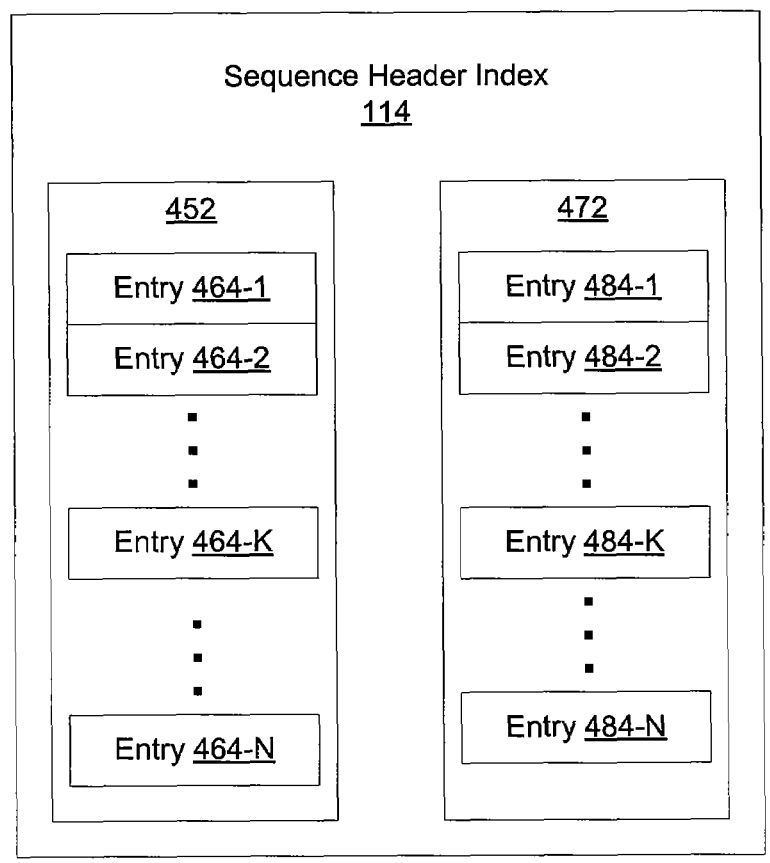
FIG. 4A is a more detailed view of the sequence header index of FIG. 1, according to one embodiment of the invention.

FIG. 4A is a more detailed view of the sequence header index 114 of FIG. 1, according one embodiment of the invention. The sequence header index 114 is a data structure that includes a video bit rate profile 452 and can be populated in any technically feasible fashion.

The sequence header index 114 included in the digital content file 132 specifies information related to the encoded sequence also included in the digital content file 132. The video bit rate profile 452 includes a corresponding set of entries 464 that specifies the locations and the timestamp offsets of the different sequence headers associated with the units of video data of the encoded sequence. Typically, the sequence headers in the encoded sequence are located at predictable timestamp offsets within the encoded sequence (ex: every 3 seconds). A given entry 464 indicates a timestamp offset and the location of a specific sequence header included in a unit of video data of the encoded sequence associated with video bit rate profile 452. For example, entry 464-1 indicates the timestamp offset and the location of the sequence header associated with a first unit of video data of the encoded sequence. Entry 464-2 indicates the timestamp offset and the location of the sequence header associated with a second unit of video data of the same encoded sequence. Importantly, a total byte count characterizing how many bytes comprise a given encoded sequence from a current playback position, associated with entry 464-K, through completion of playback may be computed based on the timestamp offsets included in the set of entries 464.

The audio data associated with the enhanced sequence is also stored in the digital content file 132. In one embodiment, the audio data has a fixed bit rate encoding. In alternative embodiments a variable bit rate encoding technique is applied to audio data, and an audio bit rate profile 472 is included in the sequence header index 114. The audio bit rate profile 472 includes entries 484 configured to store a timestamp offset and a sequence header location for each respective unit of audio data at a respective time of playback.

Figure 4B:
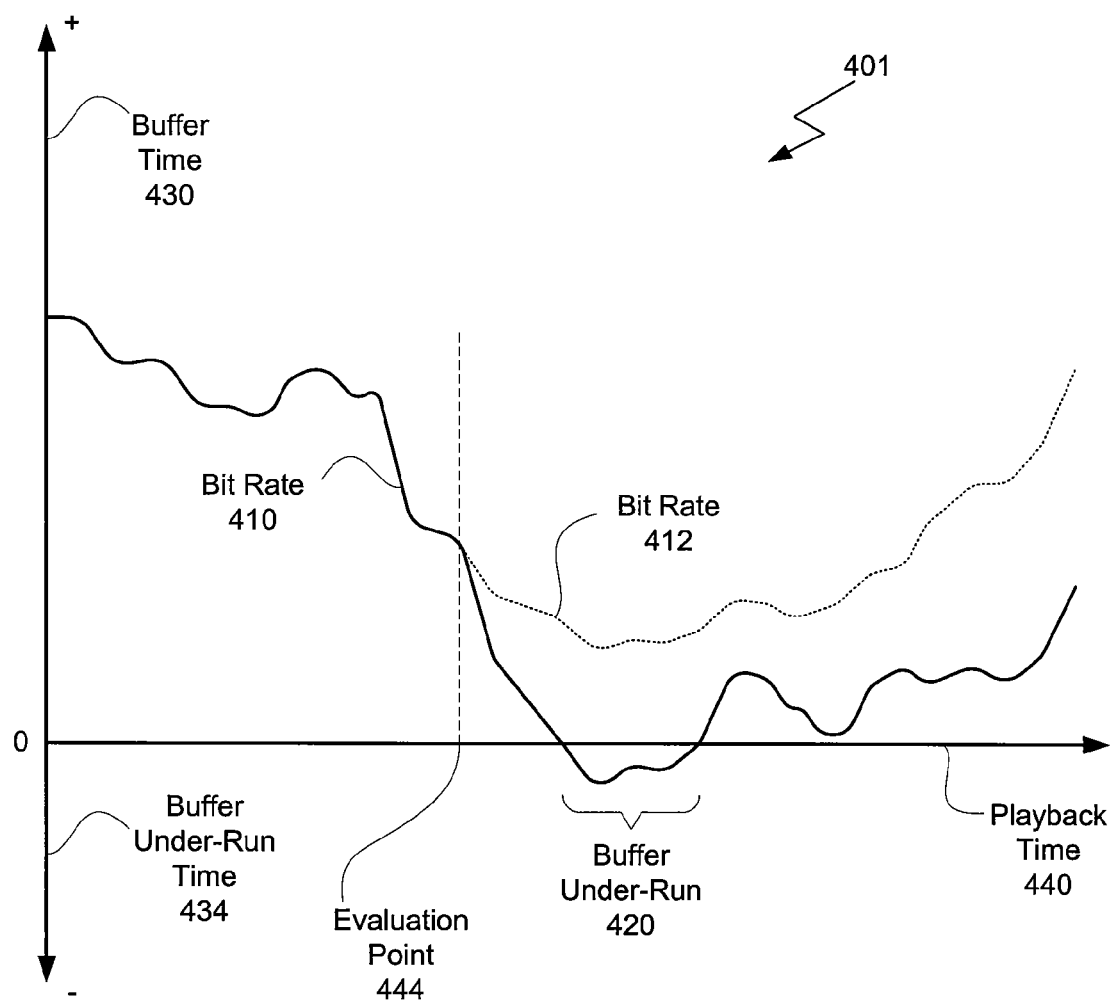
FIG. 4B is a graph illustrating the outcomes of a buffer prediction algorithms performed on two different bit rates at an evaluation point, according to one embodiment of the invention.

FIG. 4B is a graph 401 illustrating the outcomes of a buffer prediction algorithms performed on two different bit rates 410, 412 at an evaluation point 444, according to one embodiment of the invention. Buffer time 430, shown along a positive vertical axis, indicates how much effective playback time is stored within the content buffer 112 of FIG. 1. Buffer under-run time 434, shown along a negative vertical axis, indicates equivalent time deficit during a buffer under-run 420. At an evaluation point 444, the playback application 236 of FIG. 2 estimates whether playback can complete at a current playback bit rate 410, given currently available bandwidth. If the estimated buffer time 430 indicates a buffer under-run 420 for the current bit rate 410 at any playback time 440 prior to completion of playback, then continuing at the current bit rate is not feasible, but a lower bit rate 412 may be feasible. Lower bit rates are tested to find a lower bit rate that can feasibly complete playback, given the currently available bandwidth. In one embodiment the playback application 236 estimates whether playback can complete at a current playback bit rate, depicted at an evaluation point 444, periodically, such as every three seconds, during playback.

As shown, buffer time 430 estimates a buffer under-run at some point in the future for bit rate 410 and no buffer under-run for bit rate 412. In such a scenario, completing playback at bit rate 410 is not feasible given currently available bandwidth, while completing playback at bit rate 412 appears to be feasible, given the currently available bandwidth.

Figure 5:
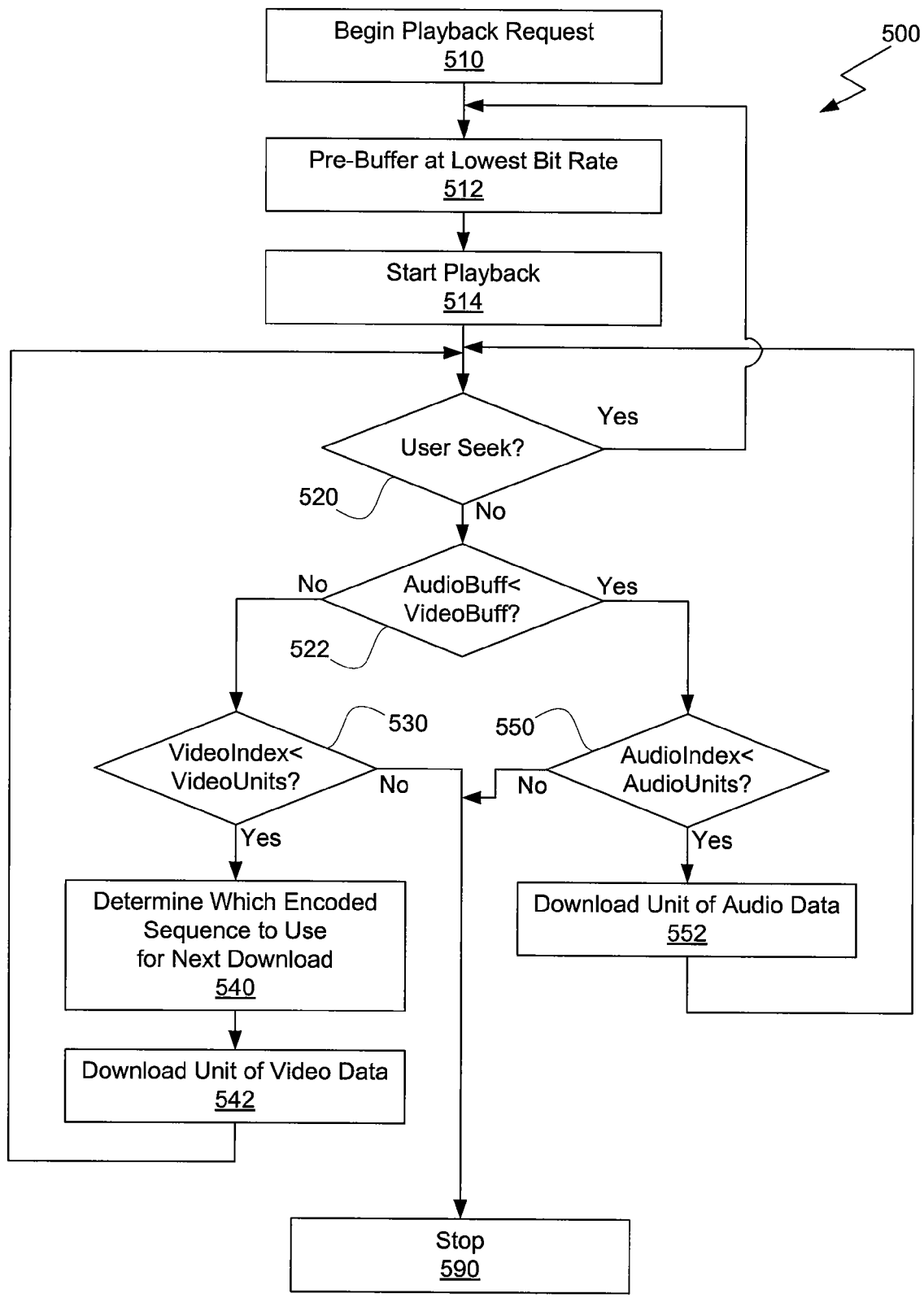
FIG. 5 is a flow diagram of method steps for adaptively buffering content data into a content buffer for playback, according to one embodiment of the invention.
Figure 6:
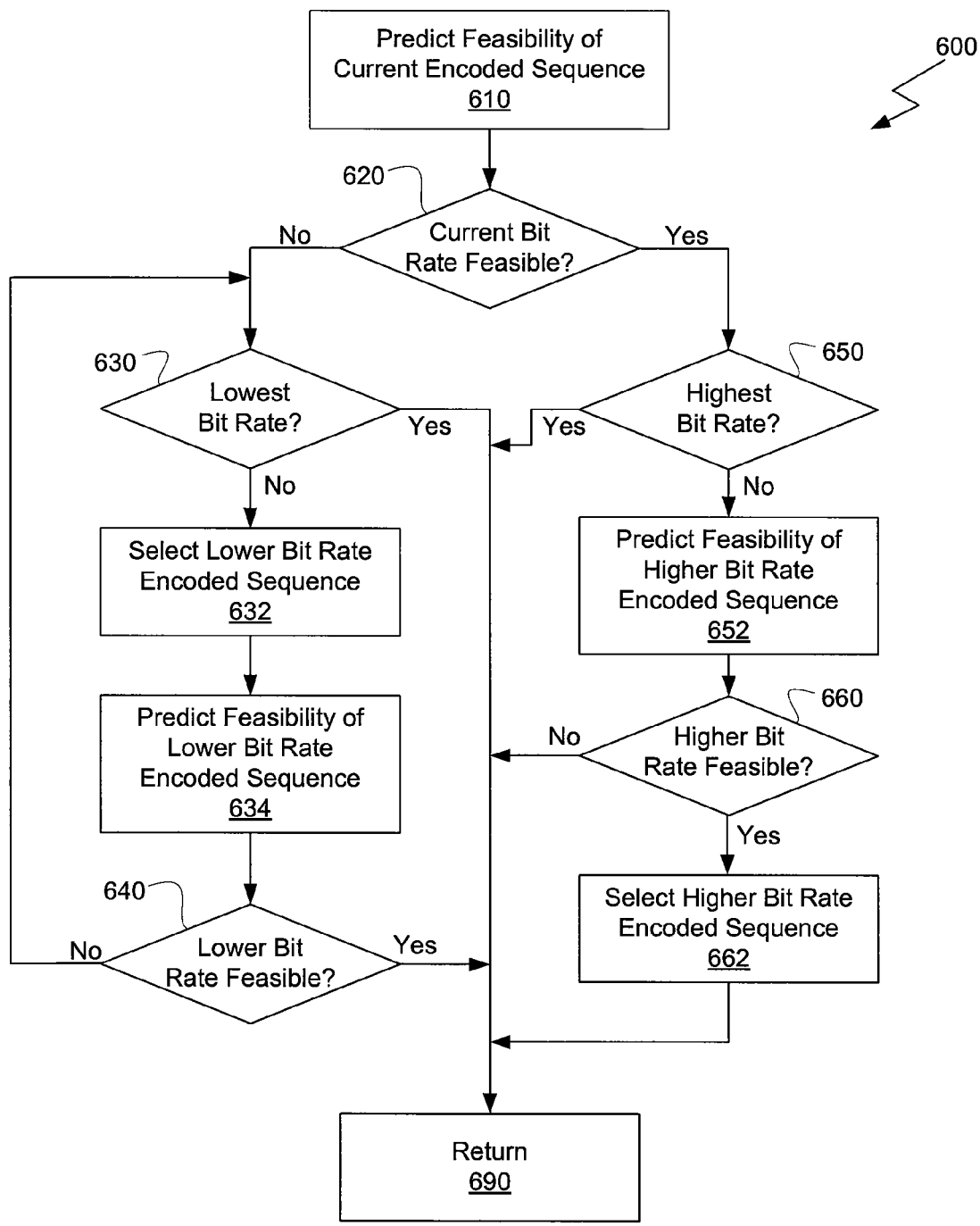
FIG. 6 is a flow diagram of method steps for changing an encoded sequence to be buffered for playback, according to one embodiment of the invention.

When predicting the feasibility of a particular encoded sequence, the playback application 236 may choose to use a single encoded sequence, and therefore a single playback bit rate, or an "aggregate encoded sequence" as input to a prediction algorithm, described in greater detail in FIGS. 5 through 7. The aggregate encoded sequence represents a combination of one or more encoded sequences, and corresponding playback bit rates for the one or more encoded sequences, which may be used in the future for playback. For example, if the playback application 236 is playing a high bit rate encoded sequence, then the playback application 236 may predict that the encoded sequence is feasible (for now) if downloading can continue for a certain threshold period of time.

After the threshold period of time, the playback application 236 can continue buffering the current encoded sequence for a period of additional time and subsequently switch to a lower bit rate encoded sequence. This is accomplished by aggregating some portion of the current encoded sequence with a later portion of time associated with a lower bit rate encoded sequence, and predicting the feasibility of the resulting aggregate encoded sequence, i.e., the aggregate of the two encoded sequences. The playback application 236 may also choose to analyze full-duration information for two or more encoded sequences in a prediction calculation, depending on the direction of an anticipated switch. For example, if the playback application 236 intends to evaluate a higher bit rate encoded sequence for future playback, the playback application 236 may evaluate the entire higher bit rate encoded sequence to ensure feasibility at the higher bit rate. However, if the playback application 236 is evaluating a high bit rate encoded sequence, which is the current encoded sequence, the playback application 236 may instead predict feasibility on an aggregate of the current encoded sequence and a lower bit rate encoded sequence in an effort to defer switching to the lower bit rate encoded sequence.

Figure 4C:
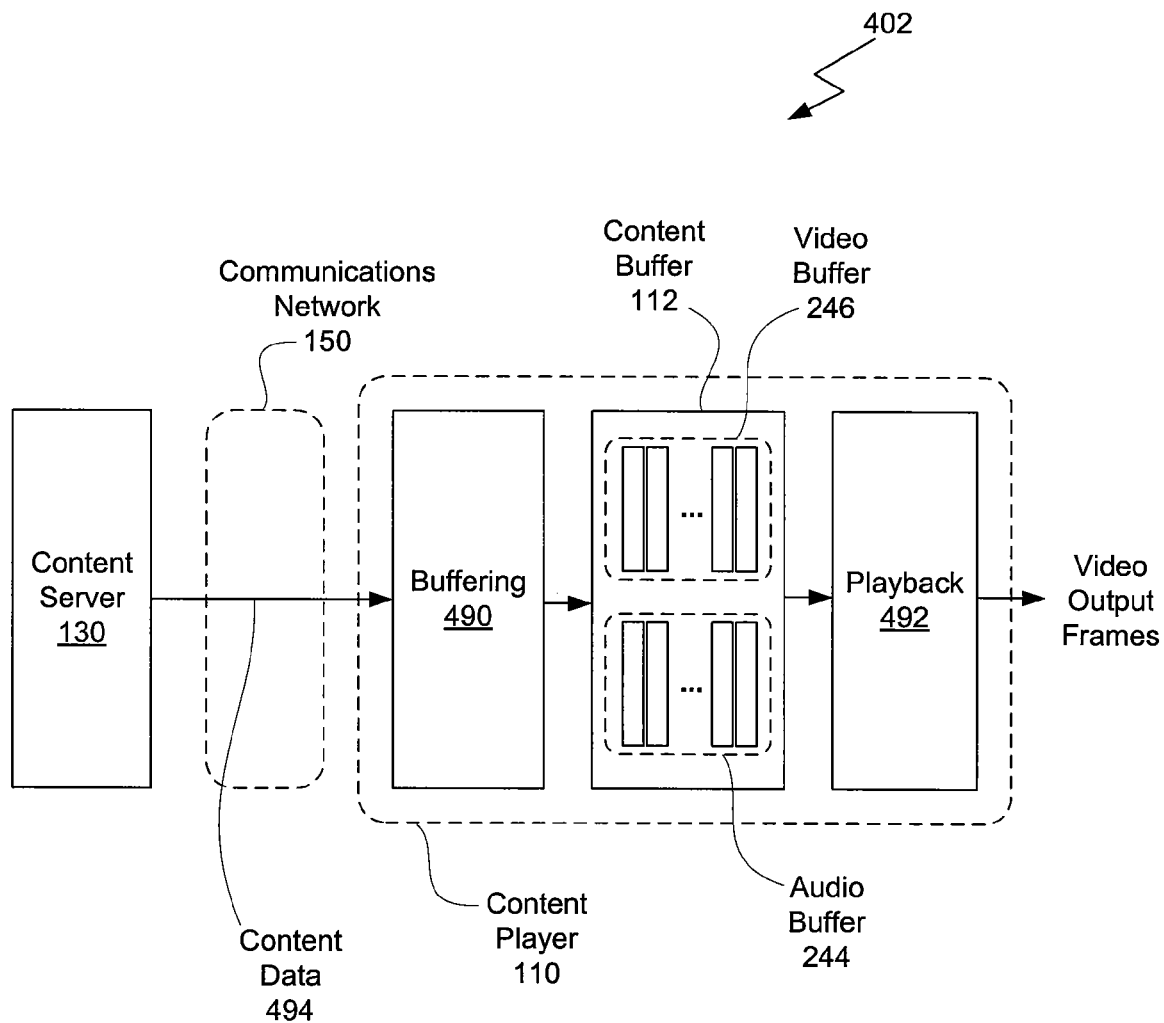
FIG. 4C illustrates data flow for buffering and playback of digital content associated with a digital content file, according to one embodiment of the invention.

FIG. 4C illustrates a data flow for buffering and playback of digital content 494 associated with a digital content file 132, according to one embodiment of the invention. The content server 130 of FIG. 1 provides content data 494, comprising units of audio data and units of video data, of the digital content file 132 to a buffering process 490. The buffering process 490 may be implemented as a thread executing within the content player 110. The buffering process 490 is configured to download the content data 494 and write the content data 494 to the content buffer 112. The buffering process 490 writes units of audio data to the audio buffer 244 within the content buffer 112, and units of video data to the video buffer 246, also within the content buffer 112. In one embodiment the content buffer 112 is structured as a first-in first-out (FIFO) queue. A playback process 492, also executing within the content player 110, de-queues units of audio data and units of video data from the content buffer 112 for playback. In order to maintain uninterrupted playback of content data 494, the content buffer 112 should always have at least one unit of audio data and one unit of video data available when the playback process 492 needs to perform a read on the content buffer 112. A buffer under-run occurs, as shown in FIG. 4B, when the content buffer 112 is empty and the playback process 492 needs to perform a read.

FIG. 5 is a flow diagram of method steps 500 for adaptively buffering content data into a content buffer 112 for playback, according to one embodiment of the invention. Although the method steps are described in conjunction with the systems of FIGS. 1, 2, and 3, persons skilled in the art will understand that any system configured to perform the method steps, in any order, is within the scope of the inventions.

The method begins in step 510, where the playback application 236 of FIG. 2 receives a request to begin playback of the digital content file 132. In step 512, the playback application 236 pre-buffers one or more units of video data of the digital content file 132 at a lowest available bit rate into the content buffer 112 of FIG. 1. The playback application 236 also pre-buffers one or more corresponding units of audio data into the content buffer 112. Pre-buffering includes downloading a certain amount of video data and audio data prior to beginning playback. In step 514, the playback application 236 starts playback. From this point forward, a playback thread executes to render and display data from the content buffer 112 while the method steps 500 are performed to buffer new data into the content buffer 112. In one embodiment, the playback thread executes as part of playback application 236.

In step 520, the playback application 236 determines whether a user seek request has been received. If, in step 520, a user seek request has been received then the method returns to step 512 for pre-buffering. If, however, in step 520, a user seek request has not been received, then the method proceeds to step 522. In step 522, the playback application 236 determines whether the playback time remaining in the audio buffer 244 (AudioBuff) is less than the playback time remaining in video buffer 246 (VideoBuff). When the playback time remaining in the audio buffer 244 is greater than or equal to the playback time remaining in the video buffer 246, then more units of video data are needed for playback by the playback application 236. When the playback time remaining in the audio buffer 244 is less than the playback time remaining in the video buffer 246, then more units of audio data are needed for playback by the playback application 236. In such a fashion, the playback application 236 balances the download of units of video data and units of audio data of the digital content file 132.

If, in step 522, the playback time remaining in the audio buffer 244 is greater than or equal to the playback time remaining in the video buffer 246, then the method proceeds to step 530. In step 530, the playback application 236 determines whether a video index (VideoIndex), corresponding to a sequential time slot for the currently playing unit of video data, is less than the total number of units of video data (VideoUnits) for the digital content file 132 currently being played. The total number of units of video data for the digital content file 132 may be retrieved from the sequence header index 114 associated with the digital content file 132.

If, in step 530, the video index is less than the total number of units of video data for the digital content file 132, i.e., not all of the units of video data for the digital content file 132 have been played, then the method proceeds to step 540. In step 540, the playback application 236 determines a next encoded sequence from which to buffer subsequent units of video data, based on buffer under-run predictions, as described in greater detail in FIG. 6. The next encoded sequence may be a higher bit rate encoded sequence, a lower bit rate encoded sequence, or the same encoded sequence as the current encoded sequence. In step 542, the playback application 236 downloads a unit of video data, based on the determined next encoded sequence, and buffers the unit of video data in video buffer 246 within content buffer 112.

Returning to step 530, if the playback application 236 determines that the video index is not less than a total number of units of video data for the digital content file 132 currently being played, then no more units of video data are needed by the playback application 236 and the method terminates in step 590.

Returning to step 522, if the playback application 236 determines that the time remaining in the audio buffer 244 is less than the time remaining in video buffer 246, then more units of audio data are needed for playback by the playback application 236 and the method proceeds to step 550. In step 550, the playback application 236 determines whether an audio index (AudioIndex), corresponding to a sequential time slot for the currently playing unit of audio data, is less than the total number of units of audio data (AudioUnits) for the digital content file 132 currently being played.

If, in step 550, the playback application 236 determines that the audio index is less than a total number of units of audio data for the digital content file 132 currently being played, then another unit of audio data is needed by the playback application 236 and the method proceeds to step 552. In step 552, playback application 236 downloads a unit of audio data and buffers the unit of audio data in audio buffer 244 within content buffer 112.

If, however, in step 550, the playback application 236 determines that the audio index is not less than a total number of units of audio data for the digital content file 132 currently being played, then no more units of audio data are needed by the playback application 236 and the method terminates in step 590.

FIG. 6 is a flow diagram of method steps 600 for determining a next encoded sequence to be buffered for playback, according to one embodiment of the invention. Although the method steps are described in conjunction with the systems of FIGS. 1, 2, and 3, persons skilled in the art will understand that any system configured to perform the method steps, in any order, is within the scope of the inventions. Again, method steps 600 describe step 540 of FIG. 5 in greater detail, and, in one embodiment, are performed by the playback application 236.

The method begins in step 610, where the playback application 236 predicts a feasibility of playing a current encoded sequence to completion without a buffer under-run. Persons skilled in the art will recognize that a feasibility determination may be implemented using any technically feasible techniques, such as the techniques described conjunction with FIG. 4B and FIG. 7A.

If, in step 620, the playback application 236 determines that the current encoded sequence corresponding to a current bit rate is not feasible, then the method proceeds to step 630. If, in step 630, the playback application 236 is currently playing an encoded sequence that does not represent a lowest bit rate encoded sequence, then the method proceeds to step 632, where the playback application 236 selects an encoded sequence corresponding to a lower bit rate than the current bit rate as a candidate encoded sequence. In step 634, the playback application 236 predicts a feasibility of playing the candidate encoded sequence, again this step is described in greater detail in FIG. 7A. If, in step 640, the playback application 236 determines that the candidate encoded sequence is feasible, then the method terminates in step 690, where the candidate encoded sequence is returned as the next encoded sequence.

Returning to step 630, if the playback application 236 is currently playing an encoded sequence that represents an encoded sequence corresponding to the lowest bit rate then the method terminates in step 690 with the current (lowest) encoded sequence returned as the next encoded sequence.

Returning to step 620, if the playback application 236 determines that the current encoded sequence is feasible, then method proceeds to step 650. If, in step 650, the playback application 236 is currently playing an encoded sequence that does not represent a highest bit rate encoded sequence, then the method proceeds to step 652. In step 652, the playback application 236 predicts feasibility of an encoded sequence corresponding to a higher bit rate than the current bit rate. Again, predicting feasibility is described in greater detail in FIG. 7A.

If, in step 660, the playback application 236 determines the encoded sequence corresponding to the higher bit rate to be feasible, then the method proceeds to step 662. In step 662, the playback application 236 selects a higher bit rate encoded sequence to be returned as the next encoded sequence. If, however, in step 660, the playback application 236 determines that the encoded sequence corresponding to the higher bit rate is not feasible, then the method terminates in step 690 with the current encoded sequence returned as the next encoded sequence.

Returning to step 650, if the playback application 236 is currently playing an encoded sequence that represents an encoded sequence corresponding to the highest bit rate, then the method terminates in step 690 with the current (highest) encoded sequence returned as the next encoded sequence.

Figure 7A:
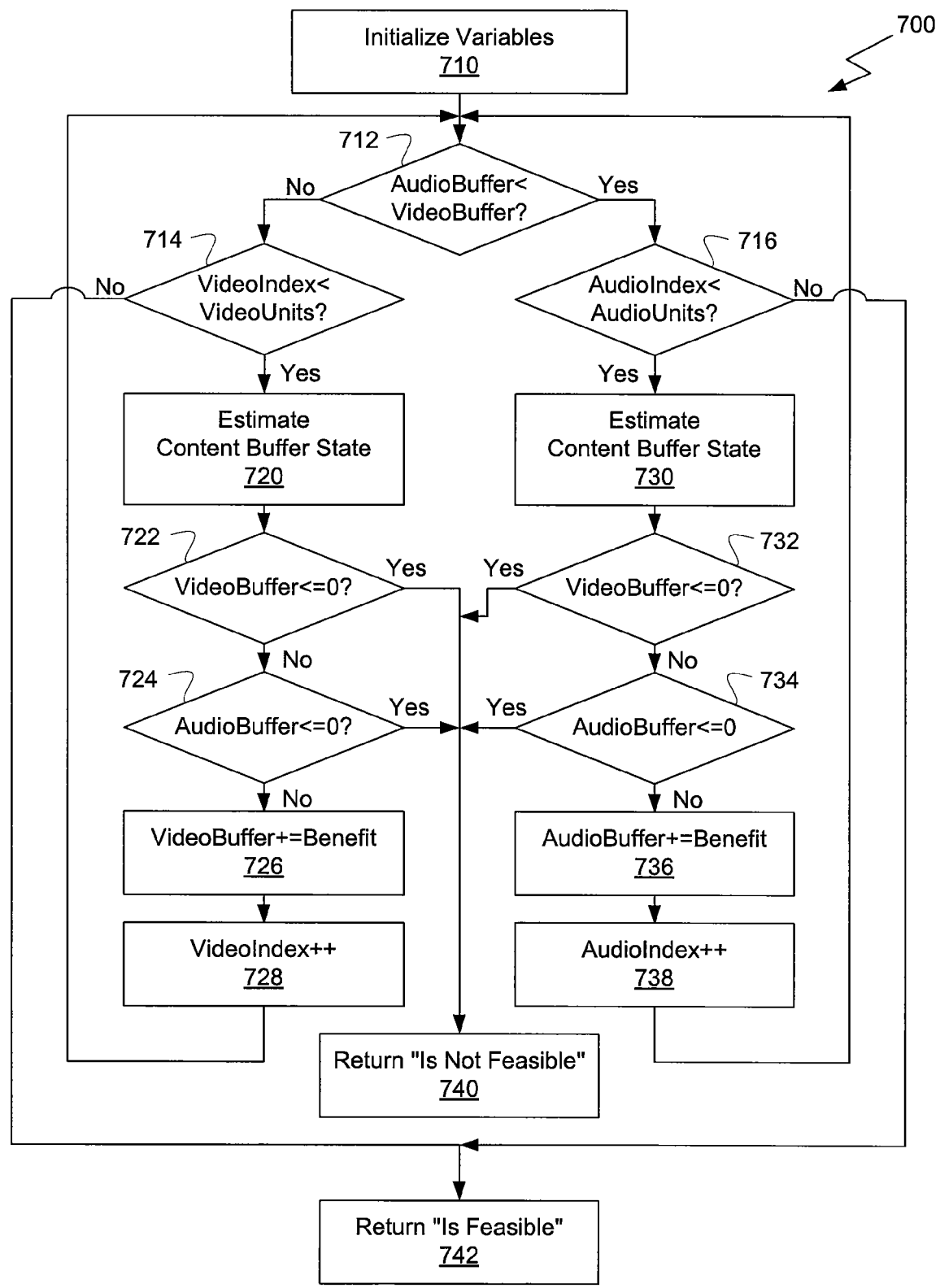
FIG. 7A is a flow diagram of method steps for predicting feasibility of completing playback at a current bit rate, according to one embodiment of the invention.

FIG. 7A is a flow diagram of method steps 700 for predicting feasibility of completing playback at a current bit rate, according to one embodiment of the invention. Although the method steps are described in conjunction with the systems of FIGS. 1, 2, and 3, persons skilled in the art will understand that any system configured to perform the method steps, in any order, is within the scope of the inventions. Again, method steps 700 describe steps 610, 634, and 652 of FIG. 6 in greater detail, and, in one embodiment, are performed by the playback application 236.

The method begins in step 710, where the playback application 236 initializes a set of variables, including AudioIndex, VideoIndex, AudioBuffer, and VideoBuffer. AudioIndex represents an index used to select a unit of audio data corresponding to a specific time slot. VideoIndex represents an index used to select a unit of video data corresponding to a specific time slot. AudioBuffer represents an amount of buffered playback time currently stored in audio buffer 244. VideoBuffer represents an amount of buffered playback time currently stored in video buffer 246. AudioIndex is initialized to a current AudioIndex, which represents a current playback state of a current audio encoded sequence. VideoIndex is initialized to a current VideoIndex, which represents a current playback state of a current video encoded sequence. AudioBuffer is initialized to a current AudioBuffer playback value. VideoBuffer is initialized to a current VideoBuffer playback value.

If, in step 712, the playback application 236 determines that AudioBuffer is not less than VideoBuffer, then less playback time is available in the video buffer than the audio buffer, and the method proceeds to step 714 to begin estimating the effects of downloading another unit of video data. If, in step 714, the playback application 236 determines VideoIndex is less than VideoUnits, which represents a total number of units of video data for the current encoded sequence, then the playback application 236 needs to download another unit of video data and the method proceeds to step 720. In step 720, the playback application 236 estimates a resulting state of the content buffer 112 if another unit of video data is downloaded from a content server 130, given a current state for the content buffer 112 and prevailing bandwidth availability. A benefit value is also calculated, measured in time duration, which can be added to the video buffer 246 should a download of a unit of video data be performed. The benefit value represents the additional playback time associated with downloading the additional unit of video data. Step 720 is described in greater detail in FIG. 7C.

If, in step 722, VideoBuffer is not less than or equal to zero, then a buffer under-run in the video buffer 246 is not currently projected and the method proceeds to step 724. If, in step 724, AudioBuffer is not less than or equal to zero, then a buffer under-run in the audio buffer 244 is not currently projected and the method proceeds to step 726. In step 726, the benefit value is added to the VideoBuffer variable to account for a download of a unit of video data. In step 728, VideoIndex is incremented to account for the download of the unit of video data. A subsequent download would be for a unit of video data corresponding to the incremented value of VideoIndex.

Returning to step 724, if the playback application 236 determines AudioBuffer is less than or equal to zero, then a buffer under-run in the audio buffer 244 is projected and the method terminates in step 740, with a return value of "is not feasible."

Returning to step 722, if the playback application 236 determines VideoBuffer is less than or equal to zero, then a buffer under-run in the video buffer 246 is projected and the method terminates in step 740, with a return value of "is not feasible."

Returning to step 714, if the playback application 236 determines VideoIndex is not less than VideoUnits, which represents a total number of units of video data for the current encoded sequence, then the playback application 236 does not need to download another unit of video data, and no buffer under-runs were detected. At this point, the playback application 236 has determined that a download of both video and audio encoded sequences can be performed without a buffer under-run and the method terminates in step 742, with a return value of "is feasible."

Returning to step 712, if the playback application 236 determines that AudioBuffer is less than VideoBuffer, then less playback time is available in the audio buffer than the video buffer, and the method proceeds to step 716 to begin estimating the effects of downloading another unit of audio data. If, in step 716, the playback application 236 determines AudioIndex is less than AudioUnits, which represents a total number of units of audio data for the current encoded sequence, then the playback application 236 needs to download another unit of audio data and the method proceeds to step 730. In step 730, the playback application 236 estimates a resulting state of the content buffer 112 if an additional unit of audio data is downloaded from the content server 130, given a current state for the content buffer 112 and prevailing bandwidth availability. A benefit value is also calculated, measured in time duration, which can be added to the audio buffer 244 should a download of a unit of audio data be performed. Step 730 is described in greater detail in FIG. 7D.

If, in step 732, VideoBuffer is not less than or equal to zero, then a buffer under-run in the video buffer 246 is not currently projected and the method proceeds to step 734. If, in step 734, AudioBuffer is not less than or equal to zero, then a buffer under-run in the audio buffer 244 is not currently projected and the method proceeds to step 736. In step 736, the benefit value is added to the AudioBuffer variable to account for a download of a unit of audio data. In step 738, AudioIndex is incremented to account for the download of a unit of audio data. A subsequent download would be for a unit of audio data corresponding to the incremented value of AudioIndex.

Returning to step 734, if the playback application 236 determines AudioBuffer is less than or equal to zero, then a buffer under-run in the audio buffer 244 is projected and the method terminates in step 740, with a return value of "is not feasible."

Returning to step 732, if the playback application 236 determines VideoBuffer is less than or equal to zero, then a buffer under-run in the video buffer 246 is projected and the method terminates in step 740, with a return value of "is not feasible."

Returning to step 716, if the playback application 236 determines AudioIndex is not less than AudioUnits, which represents a total number of units of audio data for the current encoded sequence, then the playback application 236 does not need to download another unit of audio data, and no buffer under-runs were detected. At this point, the playback application 236 has determined that a download of both video and audio encoded sequences can be performed without a buffer under-run and the method terminates in step 742, with a return value of "is feasible."

Figure 7B:
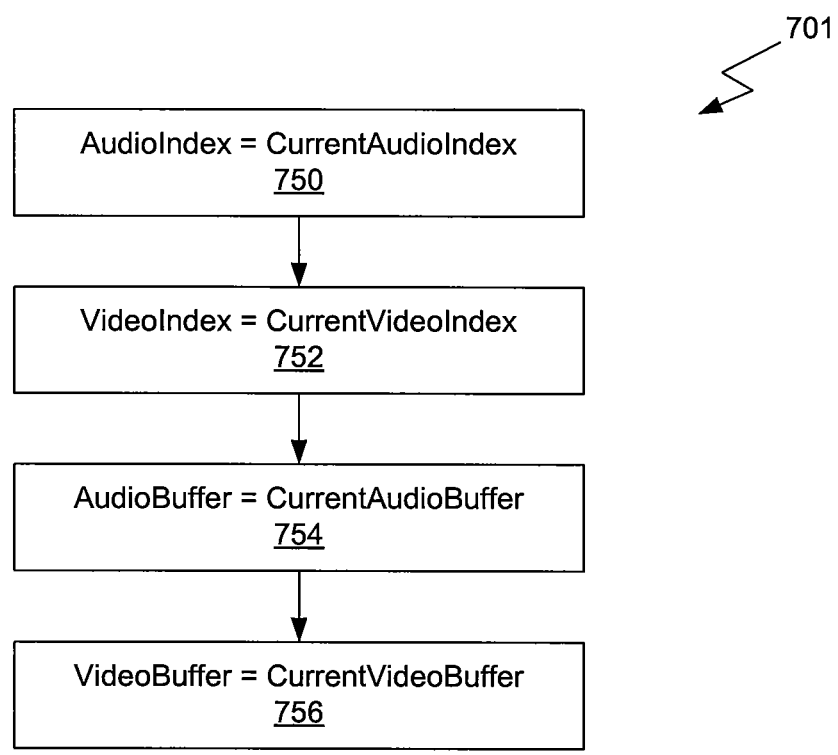
FIG. 7B is a flow diagram of method steps for performing the step of initializing variables in FIG. 7A, according to one embodiment of the invention.

FIG. 7B is a flow diagram of method steps 701 for performing the step of initializing variables 710 in FIG. 7A, according to one embodiment of the invention. Although the method steps are described in conjunction with the systems of FIGS. 1, 2, and 3, persons skilled in the art will understand that any system configured to perform the method steps, in any order, is within the scope of the inventions. Again, method steps 701 describe step 710 of FIG. 7A in greater detail, and, in one embodiment, are performed by the playback application 236.

The method begins in step 750, where AudioIndex is initialized to a current AudioIndex, which represents a current playback state of a current audio encoded sequence. In step 752, VideoIndex is initialized to a current VideoIndex, which represents a current playback state of a current video encoded sequence. In step 754, AudioBuffer is initialized to a current AudioBuffer playback value. The method terminates in step 756, where VideoBuffer is initialized to a current VideoBuffer playback value.

Figure 7C:
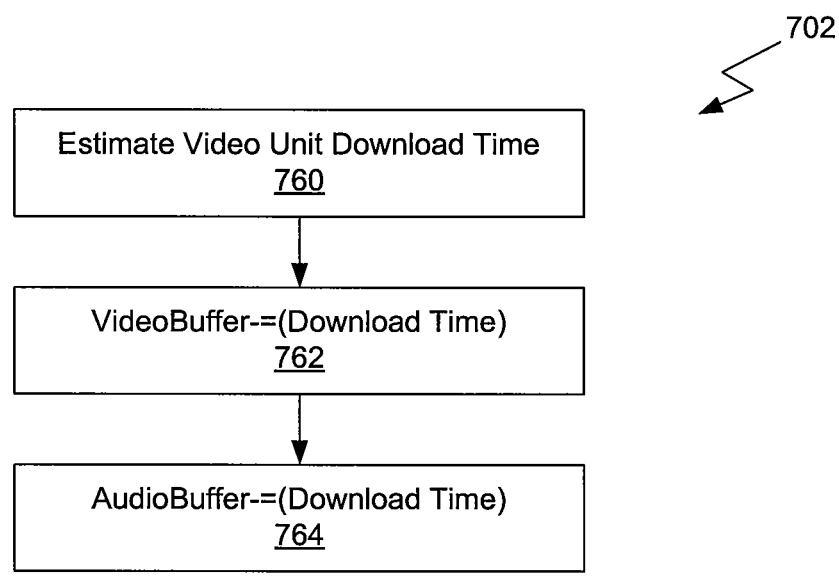
FIG. 7C is a flow diagram of method steps for performing the step of estimating content buffer state in FIG. 7A, according to one embodiment of the invention.

FIG. 7C is a flow diagram of method steps 702 for performing the step of estimating content buffer 112 state in FIG. 7A, according to one embodiment of the invention. Although the method steps are described in conjunction with the systems of FIGS. 1, 2, and 3, persons skilled in the art will understand that any system configured to perform the method steps, in any order, is within the scope of the inventions. Again, method steps 702 describe step 720 of FIG. 7A in greater detail, and, in one embodiment, are performed by the playback application 236.

The method begins in step 760, where the playback application 236 estimates a download time for a next unit of video data. A video bit rate profile 452 associated with an encoded sequence encoded to a different playback bit rate and included in a different digital content file 132 associated with the requested title is indexed using VideoIndex to look up a size for the next unit of video data. The size of the next unit of video data, in conjunction with current bandwidth availability directly determines the estimated download time. In step 762, the playback application 236 computes a value for VideoBuffer by subtracting off the download time from a current value of VideoBuffer. This new value represents estimated playback consumption of data from the video buffer 246 during the download time. Similarly, in step 764, the playback application 236 computes a value for AudioBuffer by subtracting off the download time from a current value of AudioBuffer.

Figure 7D:
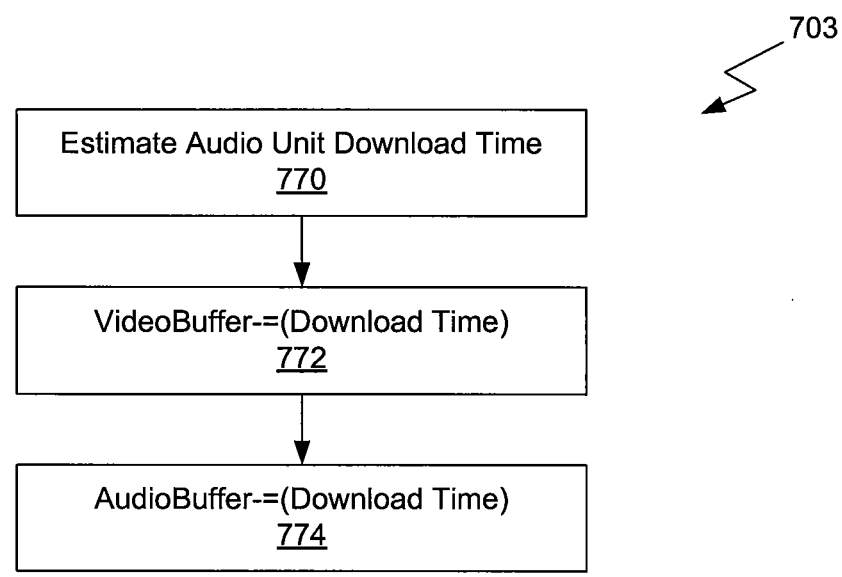
FIG. 7D is a flow diagram of method steps for performing the step of estimating content buffer state in FIG. 7A, according to one embodiment of the invention.

FIG. 7D is a flow diagram of method steps 703 for performing the step of estimating content buffer 112 state in FIG. 7A, according to one embodiment of the invention. Although the method steps are described in conjunction with the systems of FIGS. 1, 2, and 3, persons skilled in the art will understand that any system configured to perform the method steps, in any order, is within the scope of the inventions. Again, method steps 703 describe step 730 of FIG. 7A in greater detail, and, in one embodiment, are performed by the playback application 236.

The method begins in step 770, where the playback application 236 estimates a download time for a next unit of audio data. The size of the next unit of audio data, in conjunction with current bandwidth availability directly determines the estimated download time. In step 772, the playback application 236 computes a value for VideoBuffer by subtracting off the download time from a current value of VideoBuffer. This new value represents estimated playback consumption of data from the video buffer 246 during the download time. Similarly, in step 774, the playback application 236 computes a value for AudioBuffer by subtracting off the download time from a current value of AudioBuffer.

One embodiment of the invention may be implemented as a program product stored on computer-readable storage media within the content player 110. In this embodiment, the content player 110 comprising an embedded computer platform such as a set top box. An alternative embodiment of the invention may be implemented as a program product that is downloaded to a memory within a computer system, for example as executable instructions embedded within an internet web site. In this embodiment, the content player 110 comprises the computer system.

In sum, a technique for playing a digital content file on a content player 110 is disclosed. The technique involves estimating whether a particular digital content file can be feasibly played at a specific bit rate, given currently available bandwidth, and adapting the bit rate to account for prevailing bandwidth conditions. Estimating feasibility involves essentially simulating a download of remaining units of video and audio data from a current playback location in time until completion of playback. Feasibility is reassessed periodically, and if necessary, the bit rate is lowered to a feasible bit rate. If feasible, however, the bit rate is increased to increase viewing quality.

One advantage of the disclosed technique is that potential buffer under-runs based on playback bit rates and available download bandwidth are tracked and units of digital content are downloaded at the highest image quality possible while avoiding a buffer under-run condition. Furthermore, lag time associated with the start of playback is reduced by initiating playback at a relatively low bit rate, and adapting to higher playback bit rates whenever possible.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method for determining whether digital content downloaded from a content server to a content buffer can be accessed for playback from the content buffer at a predetermined bit rate without causing a buffer under-run, the method comprising:

determining that one or more units of digital content associated with a digital content title still have to be downloaded from the content server and buffered for playback;

estimating a download time associated with downloading a first unit of digital content associated with the digital content title from a first encoded sequence stored on the content server to the content buffer, wherein the first encoded sequence is included in a plurality of encoded sequences stored on the content server, and each encoded sequence comprises the digital content title encoded at a different bit rate, and the download time is based on the size of the first unit of digital content and an available download bandwidth;

computing a playback time associated with playing back the digital content stored in the content buffer;

computing an excess buffer time by subtracting the download time from the playback time;

determining whether the excess buffer time is less than or equal to zero, indicating that a buffer under-run will occur; and adding a delta playback time associated with playing back the first unit of digital content from the content buffer to the excess buffer time to generate a new playback time associated with playing back the digital content stored in the content buffer, if the excess buffer time is greater than zero, or indicating that downloading the first unit of digital content from the first encoded sequence is not feasible, if the excess buffer time is less than or equal to zero.

2. The method of claim 1, wherein, the excess buffer time is greater than zero, and the steps of determining that one or more units of digital content associated with the digital content title still have to be downloaded and buffered, estimating a download time, computing a playback time, computing an excess buffer time, determining whether the excess buffer time time is less than or equal to zero, and indicating that downloading is not feasible, or adding a delta playback time to the excess buffer time, are repeated for a second unit of digital content associated with the digital content title and included in the first encoded sequence.

3. The method of claim 1, wherein the first unit of digital content comprises video data associated with a movie or a television program.

4. The method of claim 3, wherein the step of computing a playback time associated with playing back the digital content stored in the content buffer comprises:
computing a playback time associated with playing back all video data stored in a video buffer within the content buffer; and
computing a playback time associated with playing back all audio data stored in an audio buffer within the content buffer based.

5. The method of claim 4, wherein the step of determining whether the excess buffer time is less than or equal to zero, indicating that a buffer under-run will occur, comprises:
subtracting the download time from the playback time associated with playing back all video data stored within the video buffer; and
subtracting the download time from the playback time associated with playing back all audio data stored within the audio buffer.

6. The method of claim 3, further comprising the steps of:
estimating an audio download time associated with downloading a unit of audio data from the content server based on the size of the unit of audio data and an available download bandwidth;
computing an audio playback time associated with playing back the audio data stored in the content buffer;
computing a video playback time associated with playing back the video data stored in the content buffer;
computing an excess audio buffer time by subtracting the audio download time from the audio playback time;
computing an excess video buffer time by subtracting the audio download time from the video playback time;
determining whether the excess audio buffer time or the excess video buffer time is less than or equal to zero, indicating that a buffer under-run will occur; and
adding a delta playback time associated with playing back the first unit of audio data from the content buffer to the excess audio buffer time to generate a new audio playback time associated with playing back the audio data stored in the content buffer, if a buffer under-run will not occur, or
indicating that downloading the unit of audio data is not feasible, if a buffer under-run will occur.

7. The method of claim 6, wherein the content buffer includes a video buffer for storing video data and an audio buffer for storing audio data, and wherein a buffer under-run will occur if either the time associated with playing back all of the audio data stored in the audio buffer is less than or equal to zero or the time associated with playing back all of the video data stored in the video buffer is less than or equal to zero.

8. A non-transitory computer-readable medium storing instructions that, when executed by a processing unit, cause the processing unit to determine whether digital content downloaded from a content server to a content buffer can be accessed for playback from the content buffer at a predetermined bit rate without causing a buffer under-run, by performing the steps of:
determining that one or more units of digital content associated with a digital content title still have to be downloaded from the content server and buffered for playback;
estimating a download time associated with downloading a first unit of digital content associated with the digital content title from a first encoded sequence stored on the content server to the content buffer, wherein the first encoded sequence is included in a plurality of encoded sequences stored on the content server, and each encoded sequence comprises the digital content title encoded at a different bit rate, and the download time is based on the size of the first unit of digital content and an available download bandwidth;
computing a playback time associated with playing back the digital content stored in the content buffer;
computing an excess buffer time by subtracting the download time from the playback time;
determining whether the excess buffer time is less than or equal to zero, indicating that a buffer under-run will occur; and
adding a delta playback time associated with playing back the first unit of digital content from the content buffer to the excess buffer time to generate a new playback time associated with playing back the digital content stored in the content buffer, if the excess buffer time is greater than zero, or
indicating that downloading the first unit of digital content from the first encoded sequence is not feasible, if the excess buffer time is less than or equal to zero.

9. The computer-readable medium of claim 8, wherein, the excess buffer time is greater than zero, and the steps of determining that one or more units of digital content associated with the digital content title still have to be downloaded and buffered, estimating a download time, computing a playback time, computing an excess buffer time, determining whether the excess buffer time time is less than or equal to zero, and indicating that downloading is not feasible, or adding a delta playback time to the excess buffer time, are repeated for a second unit of digital content associated with the digital content title and included in the first encoded sequence.

10. The computer-readable medium of claim 8, wherein the first unit of digital content comprises video data associated with a movie or a television program.

11. The computer-readable medium of claim 10, wherein the step of computing a playback time associated with playing back the digital content stored in the content buffer comprises:
computing a playback time associated with playing back all video data stored in a video buffer within the content buffer; and
computing a playback time associated with playing back all audio data stored in an audio buffer within the content buffer based.

12. The computer-readable medium of claim 11, wherein the step of determining whether the excess buffer time is less than or equal to zero, indicating that a buffer under-run will occur, comprises:
subtracting the download time from the playback time associated with playing back all video data stored within the video buffer; and
subtracting the download time from the playback time associated with playing back all audio data stored within the audio buffer.

13. The computer-readable medium of claim 10, further comprising the steps of:
estimating an audio download time associated with downloading a unit of audio data from the content server based on the size of the unit of audio data and an available download bandwidth;

computing an audio playback time associated with playing back the audio data stored in the content buffer;

computing a video playback time associated with playing back the video data stored in the content buffer;

computing an excess audio buffer time by subtracting the audio download time from the audio playback time;

computing an excess video buffer time by subtracting the audio download time from the video playback time;

determining whether the excess audio buffer time or the excess video buffer time is less than or equal to zero, indicating that a buffer under-run will occur; and adding a delta playback time associated with playing back the first unit of audio data from the content buffer to the excess audio buffer time to generate a new audio playback time associated with playing back the audio data stored in the content buffer, if a buffer under-run will not occur, or indicating that downloading the unit of audio data is not feasible, if a buffer under-run will occur.

14. The computer-readable medium of claim 13, wherein the content buffer includes a video buffer for storing video data and an audio buffer for storing audio data, and wherein a buffer under-run will occur if either the time associated with playing back all of the audio data stored in the audio buffer is less than or equal to zero or the time associated with playing back all of the video data stored in the video buffer is less than or equal to zero.

15. A content player device configured to determine whether digital content downloaded from a content server to a content buffer can be accessed for playback from the content buffer at a predetermined bit rate without causing a buffer under-run, the content player device comprising:

a memory that includes the content buffer for storing downloaded digital content; and a processing unit coupled to the memory and configured to:

determine that one or more units of digital content associated with a digital content title still have to be downloaded from the content server and buffered for playback;

estimate a download time associated with downloading a first unit of digital content associated with the digital content title from a first encoded sequence stored on the content server to the content buffer, wherein the first encoded sequence is included in a plurality of encoded sequences stored on the content server, and each encoded sequence comprises the digital content title encoded at a different bit rate, and the download time is based on the size of the first unit of digital content and an available download bandwidth;

compute a playback time associated with playing back the digital content stored in the content buffer;

compute an excess buffer time by subtracting the download time from the playback time;

determine whether the excess buffer time is less than or equal to zero, indicating that a buffer under-run will occur; and adding a delta playback time associated with playing back the first unit of digital content from the content buffer to the excess buffer time to generate a new playback time associated with playing back the digital content stored in the content buffer, if the excess buffer time is greater than zero, or indicate that downloading the first unit of digital content from the first encoded sequence is not feasible, if the excess buffer time is less than or equal to zero.

16. The content player device of claim 15, wherein, the excess buffer time is greater than zero, and the steps of determining that one or more units of digital content associated with the digital content title still have to be downloaded and buffered, estimating a download time, computing a playback time, computing an excess buffer time, determining whether the excess buffer time time is less than or equal to zero, and indicating that downloading is not feasible, or adding a delta playback time to the excess buffer time, are repeated for a second unit of digital content associated with the digital content title and included in the first encoded sequence.

17. The method of claim 1, wherein determining that one or more units of digital content associated with the digital content title still have to be downloaded and buffered for playback comprises determining that an index associated with the content buffer is less than a quantity of units associated with the digital content title.

18. The method of claim 17, wherein the excess buffer time is greater than zero, and further comprising incrementing the index associated with the content buffer.

19. The computer-readable medium of claim 8, wherein the processing unit is further configured to estimate a download time, compute a time associated with playing back, determine whether the computed time is less than or equal to zero, and indicate whether downloading is feasible or not feasible for a second unit of digital content, and wherein the second unit of digital content is downloaded from either the first encoded sequence or another encoded sequence included in the file of digital content.

20. The computer-readable medium of claim 19, wherein the excess buffer time is greater than zero, and further comprising incrementing the index associated with the content buffer.

21. The content player device of claim 15, wherein the first unit of digital content comprises video data associated with a movie or a television program.

22. The content player device of claim 21, wherein the processing unit is further configured to:

estimate an audio download time associated with downloading a unit of audio data from the content server based on the size of the unit of audio data and an available download bandwidth;

compute an audio playback time associated with playing back the audio data stored in the content buffer;

compute a video playback time associated with playing back the video data stored in the content buffer;

compute an excess audio buffer time by subtracting the audio download time from the audio playback time;

compute an excess video buffer time by subtracting the audio download time from the video playback time;

determine whether the excess audio buffer time or the excess video buffer time is less than or equal to zero, indicating that a buffer under-run will occur; and add a delta playback time associated with playing back the first unit of audio data from the content buffer to the excess audio buffer time to generate a new audio playback time associated with playing back the audio data stored in the content buffer, if a buffer under-run will not occur, or indicate that downloading the unit of audio data is not feasible, if a buffer under-run will occur.

* * * * *

UNITED STATES PATENT AND TRADEMARK OFFICE
CERTIFICATE OF CORRECTION

PATENT NO. : 8,631,455 B2  
APPLICATION NO. : 12/509365  
DATED : January 14, 2014  
INVENTOR(S) : Park et al.

Page 1 of 1

It is certified that error appears in the above-identified patent and that said Letters Patent is hereby corrected as shown below:

In the Claims

Column 16, Claim 2, Line 65, please delete "time" after time;

Column 18, Claim 9, Line 34, please delete "time" after time;

Column 20, Claim 16, Line 7, please delete "time" after time.

Signed and Sealed this
Twenty-second Day of April, 2014

Michelle K. Lee
*Deputy Director of the United States Patent and Trademark Office*